No. 12,619. REISSUED MAR. 19, 1907.
R. H. LYNN.
VENEERING MACHINE.
APPLICATION FILED DEC. 7, 1906.
2 SHEETS—SHEET 1.
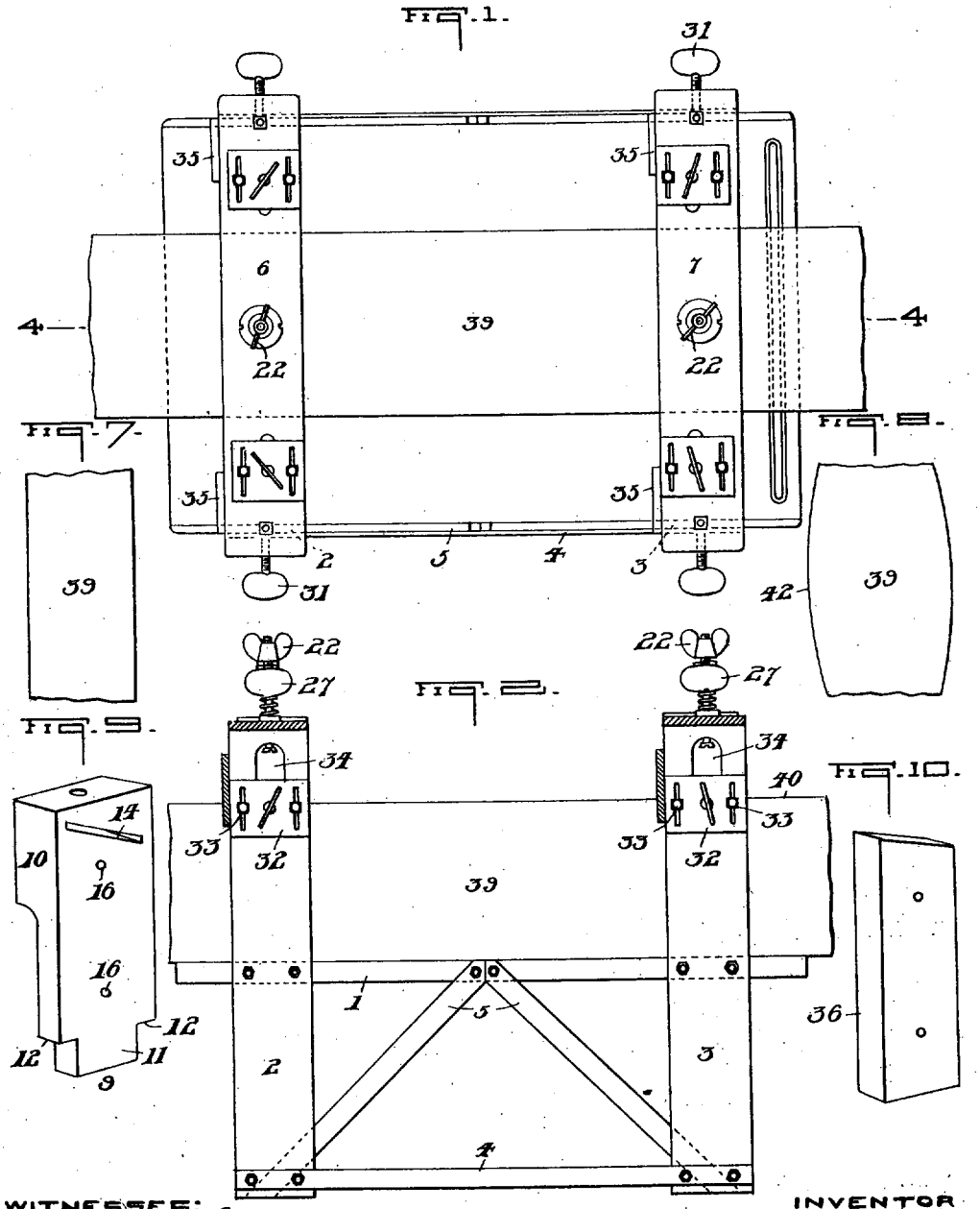
WITNESSES:
J. P. Hoffman,
Margaret Hughes
INVENTOR
Robert H. Lynn
by W. G. Doolittle
ATTORNEY
THE NORRIS PETERS CO., WASHINGTON, D. C.

No. 12,619. REISSUED MAR. 19, 1907.

R. H. LYNN.

VENEERING MACHINE.

APPLICATION FILED DEC. 7, 1906.

2 SHEETS—SHEET 2.

WITNESSES:

J. R. Hoffman

Margaret Hughes

INVENTOR

Robert H. Lynn by W. G. Doolittle

ATTORNEY

THE NORRIS PETERS CO., WASHINGTON, D. C.

UNITED STATES PATENT OFFICE.

ROBERT H. LYNN, OF BOLIVAR, PENNSYLVANIA.

VENEERING-MACHINE.

No. 12,619. Specification of Reissued Letters Patent. Reissued Mar. 19, 1907.

Original No. 814,382, dated March 6, 1906. Application for reissue filed December 7, 1906. Serial No. 346,825.

*To all whom it may concern:*

Be it known that I, ROBERT H. LYNN, a citizen of the United States, residing at Bolivar, in the county of Westmoreland and State of Pennsylvania, have invented certain new and useful Improvements in Veneering-Machines, of which the following is a specification.

This invention relates to a certain new and useful improvement in veneering-machines, and more particularly to a new and improved apparatus for veneering or coating one or more faces of a bar of clay as it is pressed out through a die of a clay-working machine preparatory to being cut up into bricks or tiles.

Prior to my invention apparatus have been designed for applying to a bar of clay as it passes from the clay-machine a coating consisting of a mixture of clay and coloring-matter or engobe; but so far as I am aware the means for applying the coating have heretofore consisted of a fixed and rigid die or frame through which the bar of clay is passed. Such means are objectionable for the reason that the clay bar after its discharge from the forming-die of the clay-machine very frequently swells, causing the bar to assume such a shape as to prevent it passing through the rigid engobe-applying die. The result is the bar is broken or the apparatus disarranged, necessitating a stoppage of the work.

The prime object of my invention is to provide means to overcome the difficulties and disadvantages heretofore encountered in apparatus of this class, and this I accomplish by the provision of yielding or flexible engobe-applying means or dies.

My invention particularly resides in the said engobe-applying means and in the resilient and adjustable mechanism employed in connection therewith.

Figure 3:
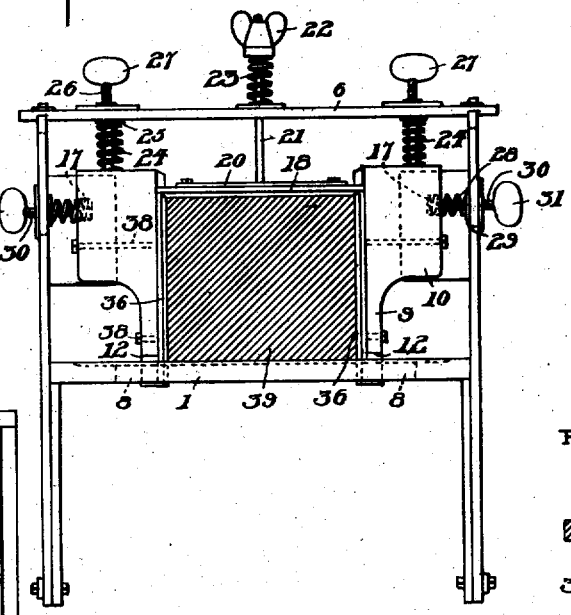
Figure 5:
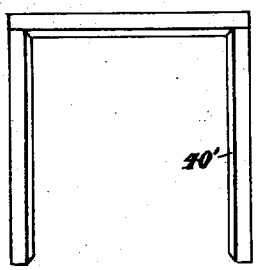
Figure 6:
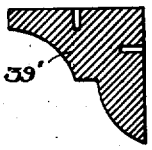
Figure 4:
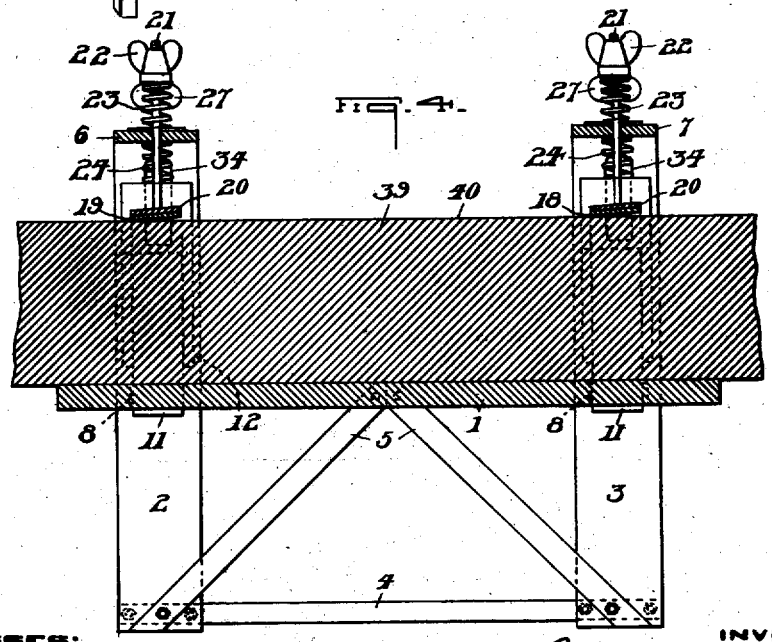

In the accompanying drawings, which illustrate an application of my invention, Figure 1 is a plan of an apparatus constructed in accordance with my invention; Fig. 2, a side elevational view; Fig. 3, a front elevational view showing a portion of the clay bar in section; Fig. 4, a longitudinal sectional view of the apparatus and a portion of the clay bar. Fig. 5 is a front elevational view illustrating a form of rigid frame or die heretofore used in this class of apparatus; Fig. 6, a view of a molding-die; Fig. 7, a view showing a piece of the clay bar of regular form; Fig. 8, a similar view illustrating a portion of the bar of irregular form; Fig. 9, a perspective of one of the frame members, and Fig. 10 a perspective view of one of the die members.

As illustrated and as preferred, my invention comprises a table or platform 1, supported by uprights 2 and 3 and suitably braced by bars 4 and 5.

6 and 7 designate cross-beams, respectively connecting the upper ends of the uprights.

The table or platform is formed with a slot 8 adjacent to each upright, and 9 designates movable frame members or plate-carriers, one located in and adapted to be moved in each slot.

A characteristic and important feature of the present invention are the yielding and resilient frames. These frames each comprise two side frame members 9 and a cross member. As illustrated, 18 represents the cross member of the forward frame, and 19 the cross member of the rear frame. Each frame member 9 has its upper end enlarged, as at 10, while its lower end is contracted, as at 11, to form shoulders 12, the function of shoulders 12 being to limit the downward movement of the frame members 9 in the respective slots 8. The enlarged upper end 10 of each frame member is provided with a transverse slot 14, said slots being angularly disposed relatively to the tops of the frame members. The top of each frame member 9 is provided with an annular recess 17. Cross members 18 and 19 of the frames are each loosely mounted in the slots 14 of the frame members 9. Cross members 18 and 19, in addition to constituting a portion of the movable frames, enter into the formation of yielding and adjustable means or dies for applying the coating or engobe to a face of the bar of clay. Plates 18 and 19 are retained in the members 9 at an angle relatively to the table or platform and relatively to the face of the clay bar being coated.

In the drawings I show an auxiliary plate 20, secured to the top of each member 18 and 19, and attached to each plate is an upwardly-extending screw-threaded stem 21. These stems extend through the respective beams 6 and 7 and carry nuts 22. Plates 20, however, may be dispensed with and the stems 21 secured directly to the plates or members 18 and 19. Interposed between the nuts 22 and the tops of the beams 6 and 7 are coiled springs 23, which surround the screw-threaded stems 21. These springs 23 serve to support the members 18 and 19, together with the frame members 9, and in cooperation with the stems and nuts said members 18, 19, and 9 may be adjusted vertically to desired positions.

To limit the upward movement of the frames, each frame member 9 upon its enlarged end is provided with a coiled spring 24, the upper end of said spring carrying a button 25, which is connected to a screw-threaded stem 26, that passes through the beams 6 and 7. The upper end of each screw-threaded stem is provided with a button or head 27, and by rotating the screws 26 the tension of the springs 24 can be regulated. These springs normally tend to depress the frames, while the springs 23 tend to elevate the frames—that is to say, by turning the nuts 22 downwardly on the stems 21 against springs 23 the frames are raised into operative positions and against the tension of springs 24.

In the recess 17 of each frame member 9 is mounted a coiled spring 28, having one end in contact with member 9 and its other end in contact with a collar 29, carried on a screw-threaded stem 30. Each stem 30 is provided with a head 31 and passes through a slot 34, formed in the respective uprights. The function of springs 28 is to control the lateral movements of the frame members 9.

32 designates screw-threaded plates adjustably mounted on the uprights over the slots 34 and secured to said uprights by screws 33. The rear edge of each upright above the table or platform 1 is provided with an inwardly-extending guide-plate 35, which serves to brace the frame members 9 and prevent the same from being moved rearwardly while the material to be coated is passing through the machine.

Secured to and carried by each frame member 9 is a plate 36. These plates constitute side members of the engobe-applying means or die and have their upper ends in contact with the respective cross members 18 and 19 of the engobe-applying means. As shown, plates 36 are secured to the frame members by means of screws 38, located in the openings 16 of frame members 9.

By the construction above described I form adjustable and yielding means or dies for applying the coating material or engobe to the bar of clay as it is passed through the apparatus from any suitable clay-bar-forming machine employed in connection with my invention. The die members are set to form funnel-shaped openings, through which the clay bar passes.

In operating my invention my apparatus is suitably supported in advance of and in line with the forming-die of a clay-bar machine. (Not shown.) As illustrated, 39 designates a moving bar of clay passing through the machine to receive the coating and preparatory to being cut up into bricks or tiles. In practice the coloring-matter or engobe is supported by the top surface 40 of the clay-bar immediately in front of the first die or engobe-applying means, and as the bar passes through the adjustable and yielding forward die the coating is applied thereto. By adjusting the cross member 18 vertically a coating of more or less thickness may be pressed on the surface 40. As the bar is passed through the rear die the veneering or coating process is finished, and the bar is now ready to be cut up into bricks or tiles. If it is desired to veneer a bar formed with a molding, molding-dies 39′, as shown by Fig. 6, are employed. These molding-dies may be secured to the adjustable frames by any suitable means.

By the employment of a yielding or flexible die or engobe-applying means instead of a rigid die 40′, as illustrated by Fig. 5, and as heretofore used in apparatus of this class, I am enabled to successfully coat the moving bar even in cases where the bar of clay is of irregular form, as mentioned above and as indicated at 42, Fig. 8.

What I claim is—

1. In a veneering-machine of the character described the combination, with a table or support, of means for applying a coating to a surface of a moving bar of clay comprising a yielding frame having an inclined cross member adjacent to the surface to be coated through which the bar is passed, and means for adjusting the frame.

2. In a veneering-machine of the character described the combination, with a table or support, of a flexible engobe-applying die comprising independent movable side members and a cross member.

3. In a veneering-machine of the character described the combination, with a table or support, of a flexible engobe-applying die consisting of two independent side members and a cross member, and movable supporting means for the die members.

4. In a veneering-machine of the character described the combination, with a support for a moving bar of clay, of a flexible engobe-applying die consisting of two independent side members and a cross member, movable supporting members for the die members, and means for adjusting the supporting members.

5. In a veneering-machine of the character described the combination with a table, of uprights extending above the table, a cross-beam connecting the uprights, a flexible engobe-applying die consisting of two independent side members and a cross member, resilient die-carrying members, and means for adjusting the latter members.

6. The combination with a table supported by uprights, of yielding frames mounted upon said table and forming funnel-shaped openings in alinement with one another, means to vertically adjust said frames, means to horizontally adjust said frames to regulate the size of said openings.

7. In a veneering-machine of the character described the combination, with a support, of means for applying a coating to a surface of a moving bar of clay comprising a yielding frame having two side members formed with slots and a cross member having its ends located in the slots.

In testimony whereof I affix my signature in presence of two witnesses.

ROBERT H. LYNN.

Witnesses:
I. L. HAMMOND,
C. W. CLEWELL.